US010081050B2

(12) United States Patent
Godfrey

(10) Patent No.: US 10,081,050 B2
(45) Date of Patent: Sep. 25, 2018

(54) LOCKBOLT TOOL NOSE ASSEMBLY

(71) Applicant: Gage Bilt, Inc., Clinton Township, MI (US)

(72) Inventor: Bruce T. Godfrey, Washington Township, MI (US)

(73) Assignee: Gage Bilt, Inc., Clinton Township, MI (US)

( * ) Notice: Subject to any disclaimer, the term of this patent is extended or adjusted under 35 U.S.C. 154(b) by 212 days.

(21) Appl. No.: 15/183,177

(22) Filed: Jun. 15, 2016

(65) Prior Publication Data

US 2017/0361370 A1    Dec. 21, 2017

(51) Int. Cl.
*F16B 19/05* (2006.01)
*B21J 15/02* (2006.01)
*B21J 15/32* (2006.01)

(52) U.S. Cl.
CPC .............. *B21J 15/022* (2013.01); *B21J 15/32* (2013.01); *F16B 19/05* (2013.01)

(58) Field of Classification Search
CPC ........ B21J 15/022; B21J 15/32; B21J 15/105; B21J 15/20–15/22; B21J 15/00; B21J 15/043; B21J 15/045; B21J 15/326; B21J 15/02; F16B 19/05; F16B 19/1045; F16B 19/1054; F16B 4/004; F16B 39/284; F16B 39/00; F16B 39/025; F16B 39/026; F16B 39/12; F16B 39/126; F16B 39/28; Y10T 29/53735; Y10T 29/53739; Y10T 29/53496; Y10T 29/49956; Y10T 29/49925; Y10T 29/49929; Y10T 29/29948; Y10T 29/535; Y10T 29/5377; Y10T 29/49934; Y10T 29/53726–29/53743; Y10T 29/5664; B23P 9/025
See application file for complete search history.

(56) References Cited

U.S. PATENT DOCUMENTS

| | | | | |
|---|---|---|---|---|
| 3,142,903 A * | 8/1964 | Stiller | .................. | B67B 7/44 30/450 |
| 3,698,231 A * | 10/1972 | Davis, Jr. | ............... | B21J 15/022 29/243.522 |
| 7,677,853 B2 * | 3/2010 | Donovan | ............... | F16B 19/05 411/361 |
| 8,302,272 B2 * | 11/2012 | Dear | ..................... | B21J 15/022 29/243.5 |
| 2015/0252833 A1 * | 9/2015 | Brewer | ................. | B21J 15/022 29/509 |

* cited by examiner

*Primary Examiner* — Jun Yoo
(74) *Attorney, Agent, or Firm* — Young Basile Hanlon & MacFarlane, P.C.

(57) ABSTRACT

The present invention relates to a nose assembly with integrated anvil and puller to assist in swaging a collar to a lockbolt type fastener. The nose assembly has a sidewall defining a hollow axially extending interior and an open terminal end, hollow axially extending interior having a first interior diameter, and an annular recess of a second interior diameter greater than the first interior diameter. A puller is slidably displaceable relative to the holder sidewall. The puller is configured with opposing sets of teeth for gripping a lockbolt pintail and to close grippingly on the lockbolt pintail when the puller is axially displaced relative to the holder sidewall sufficiently to draw a head portion of the puller at least partially out of the recess and into the first interior diameter length.

10 Claims, 5 Drawing Sheets

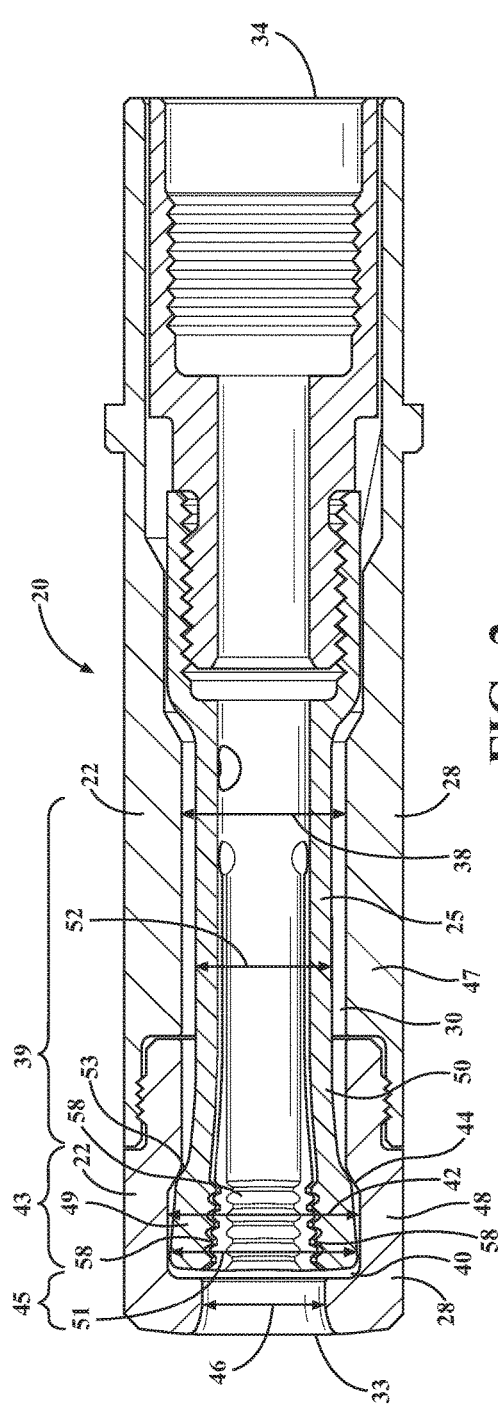
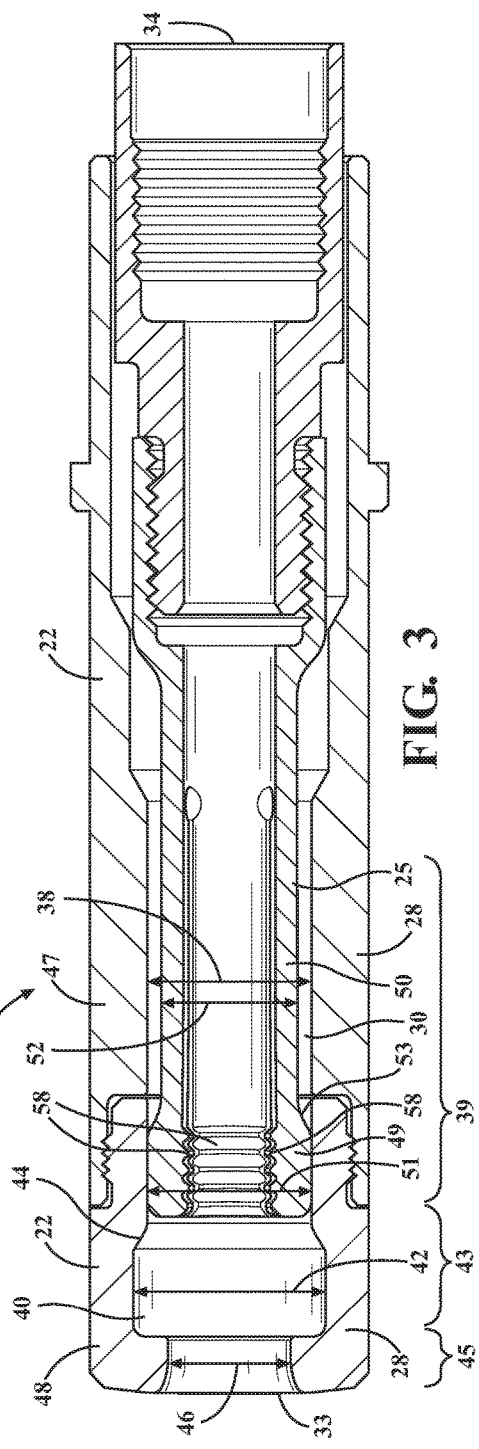

LOCKBOLT TOOL NOSE ASSEMBLY

FIELD OF THE INVENTION

The present invention relates to an assembly for effectuating the installation of a pintail lockbolt, specifically, a nose assembly with integrated anvil and puller to assist in swaging a collar to a pintail lockbolt type fastener.

BACKGROUND OF THE INVENTION

Lockbolt type fasteners typically have a shaft with a series of annular protrusions or spirals and grooves. One set of grooves receives material from a collar that is placed around the bolt, the collar swaged such that it deforms to fill the grooves. Another set of grooves, located on the pintail, is gripped by a puller of a fastener installation tool during the swaging process. The portion of the lockbolt with the protrusions to be gripped by the fastener installation tool is commonly referred to as a pintail. The fastener installation tool typically has an anvil with a smaller interior diameter than the outer diameter of the collar to be swaged to the lockbolt. The puller pulls the lockbolt and collar into the anvil, thus swaging the collar to the lockbolt and breaking off the pintail.

To facilitate the breaking off, lockbolts include a neck area between the sets of grooves, the neck area distinguishing the main lockbolt from the pintail. The neck area provides a weak point in the lockbolt to enable the pintail to be removed, or broken off, after the collar has been swaged. Removal of the pintail is typically accomplished with the puller continuing to apply force to the lockbolt after the swage operation has been completed.

One example of a lockbolt installation tool can be found in U.S. Pat. No. 7,921,530, incorporated herein by reference.

Some current tool designs produce interference, or rubbing, of the puller against the lockbolt while the tool is being positioned. The rubbing causes wear and tear on the tool and requires care to ensure that the lockbolt is not pushed out of place in the workpiece by the puller. The puller can also protrude from the end of the tool, giving unnecessary exposure to the puller.

SUMMARY OF THE INVENTION

A first aspect of the invention is a nose assembly for a pintail-type lockbolt installation tool. The nose assembly comprises two main parts: an elongate tubular holder and, coaxially and slidably disposed within the holder, a puller with a head portion having integral teeth designed to releasably engage and grasp the grooves of a lockbolt pintail.

The puller comprises an elongate tubular body that is axially slotted such that the head portion can be squeezed radially inwardly to transition the head portion between a normally open condition wherein the head portion is radially expanded such that the integral teeth are open to accept a pintail, and a closed condition wherein the head is forcibly radially contracted to close the teeth onto the grooves of the lockbolt pintail. The transition is effected by axially sliding the puller within the holder from a first axial position wherein the puller head lies within a well-defined annular recess in the interior bore of the holder that is large enough to allow the puller head to expand radially into its normally open condition. When displaced axially inwardly in the holder, the head portion comes out of the annular recess and into a smaller diameter portion of the holder interior where the head portion is forced into the closed, pintail grasping, condition.

As further detailed in the disclosed embodiment, the nose assembly comprises a main body having a hollow axially extending interior and an anvil secured to the main body. The anvil has a hollow axially extending interior. The anvil comprises a swage portion, a recess portion and a retraction portion. The recess portion is disposed between the swage portion and the retraction portion. The recess portion has an interior diameter that is greater than an interior diameter of the swage portion and an interior diameter of the retraction portion. The nose assembly further comprises a puller comprising a shaft portion and a head portion. The head portion has a larger outer diameter than the shaft portion. The head portion is movable between an open condition and a closed condition. The puller is disposed in the hollow axially extending interior of the main body and in the hollow axially extending interior of the anvil. The puller is able to move within the hollow axially extending interior between an extended position and a retracted position. In the extended position, the head portion of the puller is disposed in the recess portion of the anvil with the head portion in the open condition. In the retracted position, the head portion of the puller is disposed in the retraction portion of the anvil with the head portion in the closed condition.

A second aspect of the present disclosure is a method for installing a lockbolt. The method comprises providing a lockbolt installation tool with a nose assembly that includes an elongate tubular holder having a sidewall defining a hollow axially extending interior and an open terminal end. The sidewall defines along its length a first interior diameter, and, proximate the open end, an annular recess of a second interior diameter greater than the first interior diameter. An elongate hollow and generally cylindrical puller is coaxially disposed within the hollow interior, and axially slidably displaceable relative to the holder sidewall. The puller has an annular head portion of a diameter that fits into the holder when aligned therewith. The puller head portion is configured with opposing sets of teeth for gripping a lockbolt pintail. The lockbolt installation tool is placed over lockbolt such that the open terminal end abuts a collar encircling the lockbolt with the lockbolt pintail disposed between the gripping teeth. The pintail is gripped with the lockbolt installation tool by retracting the puller relative to the sidewall such that the puller moves away from the open terminal end. The collar is swaged by continuing the retraction of the puller, thereby drawing the collar into an anvil portion the lockbolt installation tool. The pintail is separated from the lockbolt by continuing the retraction of the puller. The lockbolt installation tool is removed from the collar by extending the puller relative to the sidewall such that the puller moves toward from the open terminal end, thereby causing the pintail to press against lockbolt while the pintail is gripped by the head portion. The pintail is released from the puller by continuing the extension of the puller towards the open terminal end until the puller is disposed in the recess portion.

BRIEF DESCRIPTION OF THE DRAWINGS

The various features, advantages and other uses of the present nose assembly will become more apparent in view of the following description and drawings in which:

FIG. 2 is a cross sectional view of the nose assembly in an extended position;

FIG. 3 is a cross sectional view of the nose assembly in a retracted position;

DETAILED DESCRIPTION OF THE PREFERRED EMBODIMENTS

Figure 1:
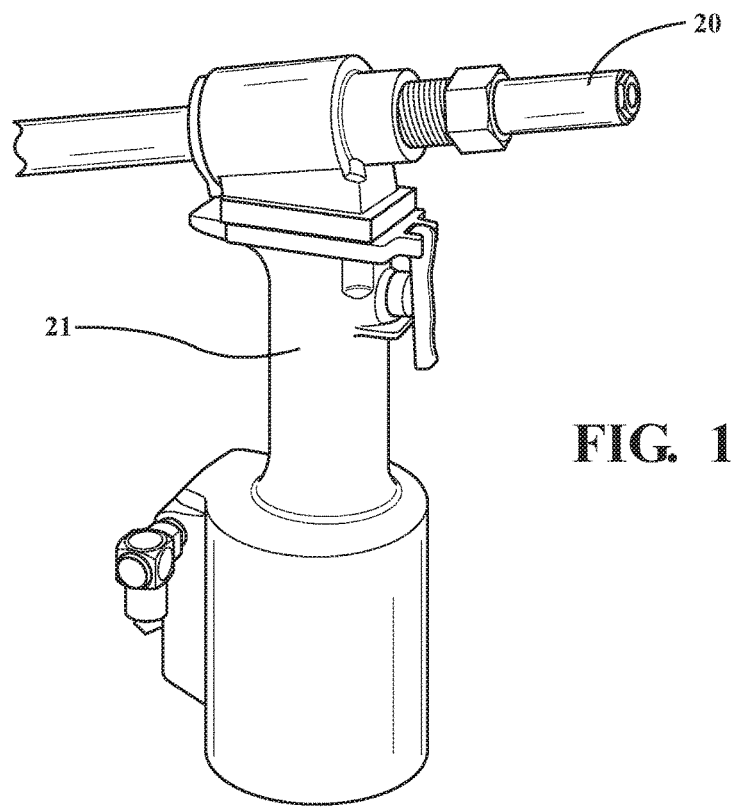
FIG. 1 is a perspective view of an installation tool with a nose assembly.

FIGS. 1 through 3 show an illustrative embodiment of a nose assembly 20 for a lockbolt installation tool 21. The nose assembly 20 is made up of two main parts: a holder 22 and a puller 25.

The holder 22 has an elongate tubular shape formed by a sidewall 28 which defines a hollow axially extending interior 30 with an open terminal end 33 opposite a connection end 34. The connection end 34 provides as attachment point for the nose assembly 20 to connect to the lockbolt installation tool 21. One example of a suitable lockbolt installation tool is the BV731V manufactured by Gage Bilt Inc., located in Clinton Township, Mich., and at www.gagebilt.com.

The sidewall 28 includes an interior surface which defines various interior diameters at different locations along the length of the holder 22. A first interior diameter 38 is defined along the length of the holder 22 spaced apart from the terminal end 33. The area where the sidewall 28 defines the first interior diameter 38 is the retraction portion 39. Between the area along the sidewall 28 defining the first interior diameter 38 and the terminal end 33, an annular recess 40 is formed.

The annular recess 40 has a second interior diameter 42. The second interior diameter 42 is defined by the sidewall 28 in an area where the annular recess 40 is formed, and is greater than the first interior diameter 38. The annular recess 40 is located proximate the open terminal end 33. The area of the sidewall 28 defining the annual recess is the recess portion 43.

In the exemplary embodiment the first interior diameter is 0.438 inches, and the second interior diameter is 0.510 inches.

The sidewall 28 also defines an interior frustroconical portion 44 connecting the first interior diameter 38 to the second interior diameter 42. The interior frustroconical portion 44 is a sloped annular surface running the interior circumference of the sidewall 28 between the recess portion 33 and the retraction portion 39.

Between the recess portion 43 and the open terminal end 33 is a swage portion 45. The swage portion 43 has a third interior diameter 46 defined by the sidewall 28. The third interior diameter is smaller than the second interior diameter 24.

The holder 22 may be formed from separate pieces, such as a main body 47 and an anvil 48. The anvil 48 and main body 47 are connected by a matching pair of male and female threads. The multi-piece design allows the easy change of one anvil for another so that the nose assembly 20 may be used with various collar and lockbolt types. It also enables easy access to the puller 25 should the puller need to be replaced because of design or wear considerations.

The puller 25 has an elongate hollow and generally cylindrical shape. The puller 25 comprises an annular head portion 49 and a shaft portion 50. The puller 25 has a first outer diameter 51 at the head portion 49 that is greater than a second outer diameter 52 at the shaft portion 50.

On the puller 25, the first outer diameter 51 is connected to the second outer diameter 52 by an outer frustroconical portion 53. The outer frustroconical portion 53 is a sloped annular surface running the exterior circumference of the puller between the head portion 49 and the shaft portion 50.

Figure 4:
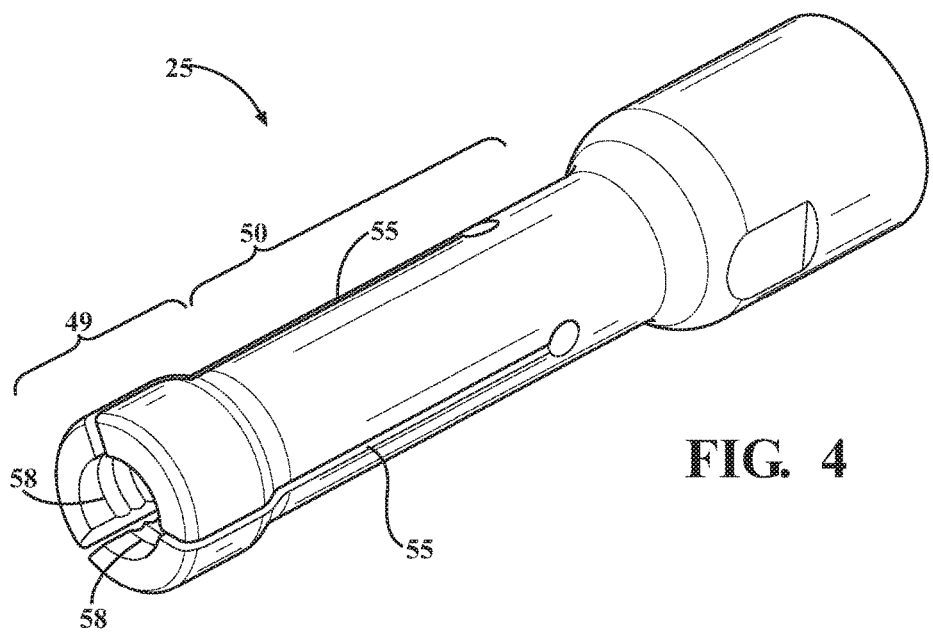
FIG. 4 is a perspective view of a puller.

A plurality of slots 55 extend axially along the puller 25, as shown in FIG. 4. Sets of gripping teeth 58 are formed along an interior of the head portion 49. The sets of gripping teeth 58 oppose each other, and are configured for gripping a lockbolt pintail. Such configuration may be achieved by the gripping teeth 58 having commentary height, depth and spacing to engage the protrusions and grooves of the lockbolt pintail intended to be used.

The head portion 49 is capable of being flexed between an open condition, as shown in FIG. 2, and a closed condition, as shown in FIG. 3. Comparatively, the opposing sets of gripping teeth 58 are further apart in the open condition than in the closed condition.

The puller 25 is configured such that its natural resting position, without any external applied force, is with the head portion 49 in the open condition. The head portion 49 has a radial resilience such that when an external force is applied, the head portion 49 may be transitioned to the closed condition by radial force, and when the external force is removed, the head portion 49 transitions back to the open position. This radial resilience in the head portion 49 is created, at least in part, by the plurality of axially extending slots 55 formed in the puller 25 which enables independent relative movement of the opposing sets of gripping teeth 58.

The puller 25 is coaxially disposed in the hollow interior 30 of the holder 22, with the head portion 49 of a diameter that fits into the holder 22 when aligned therewith. The puller 25 is axially slidably displaceable relative to the sidewall 28. Within the holder 22, the puller 25 slides between an extended position, as shown in FIG. 2, and a retracted position, as shown in FIG. 3.

In the extended position, the head portion 49 is received in the annular recess 40, with the head portion 49 in the open condition such that the first outer diameter 51 defined by the head portion 49 is generally equal to the second interior diameter 42 defined by the sidewall 28 at the annular recess 40. The head portion 49 is configured such that in the open condition, the distance between the opposing sets of gripping teeth 58 is sufficient to allow the desired sized pintail to be received by the puller 25 without interface between the pintail and the teeth 58. This saves wear and tear on the teeth.

In the retracted position, the head portion 49 is received in the area of the sidewall 28 defining the first interior diameter 38, with the head portion 49 in the closed condition such that the first outer diameter 51 defined by the head portion is generally equal to the first interior diameter 38. The head portion is configured such that in the closed condition, the distance between the opposing sets of gripping teeth 58 is sufficient to allow the gripping teeth 58 and head portion 49 to close grippingly on the desired sized pintail. Closing grippingly on the pintail involves sufficient relative movement and force between the opposing sets of teeth 58 such that the teeth engage with the protrusions and grooves on the pintail to enable pulling by the puller 25 without causing damage to the sets of teeth 58 or otherwise causing the nose assembly 20 to jam.

To provide sufficient clearance and enable the head portion 49 to have a full range of motion between the open condition and the closed condition, the difference between the first interior diameter 38 and the second outer diameter 52 at the shaft portion 50 while the head portion 49 is in the closed position is eighty percent or greater than difference between the first interior diameter 38 and the second interior diameter 42. The desired ratio between these differences may be determined in part based on the axial length of the retraction portion 39, and the difference in outer diameter of the head portion 49 in the open and closed conditions.

The holder 22 and the puller 25 are made of hardened tool steel. The puller 25 has a sufficient elasticity to return to the open condition after a force is applied to place it in the closed condition.

Operation of the nose assembly 20 is shown in FIGS. 5-10, and further described below.

Figure 5:
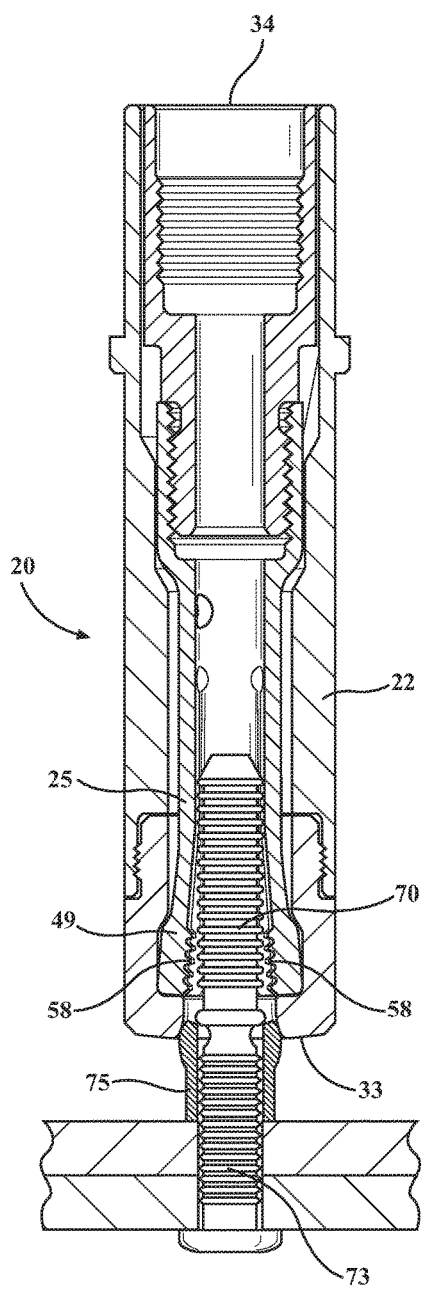
FIG. 5 is a cross sectional view of the nose assembly when positioned over a lockbolt with the puller in an open condition.

As shown in FIG. 5, the nose assembly 20 with the head portion 49 in the open condition is placed over a pintail 70 of a lockbolt 73. The pintail 70 is inserted into the nose assembly 20 until the lockbolt 73 is disposed between the opposing sets of teeth 58 and the open terminal end 33 of the holder 22 abuts a collar 75 encircling the lockbolt 73. When placing the nose assembly 20 over the pintail 70, optimal performance and tool life may be achieved if contact between the sets of teeth 58 and the lockbolt 73 is avoided.

Figure 6:
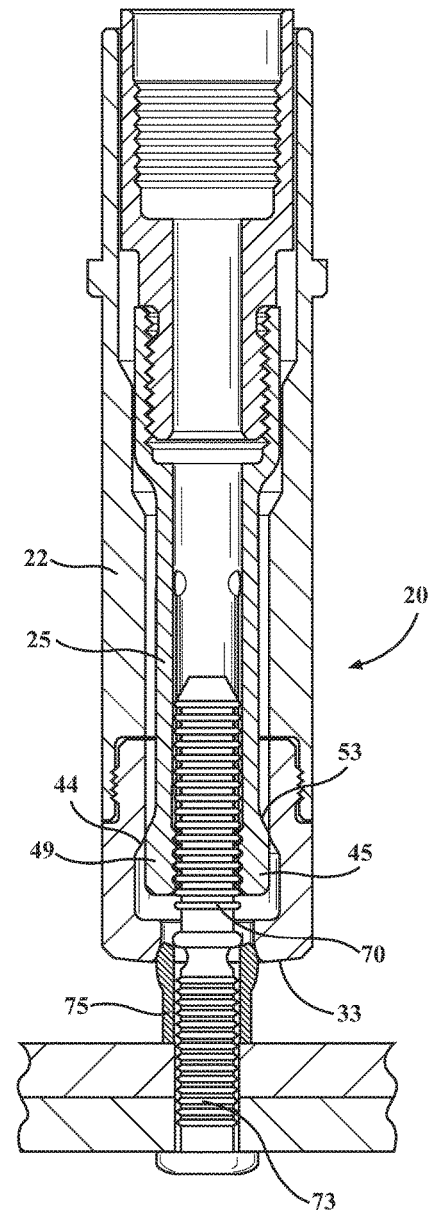
FIG. 6 is a cross sectional view of the nose assembly when positioned over the lockbolt with the puller in a closed condition.

As shown in FIG. 6, after the nose assembly 20 is placed over the lockbolt 73, the pintail 70 is gripped with nose assembly 20. The gripping is done with the sets of teeth 58 on the head portion 49. The puller 25 is moved towards the retracted position, away from the open terminal end 33. As the puller 25 is retracted towards the retraction position, the outer frustroconical portion 53 of the puller slidably engages the interior frustroconical portion 44 of the holder 22. A resulting camming force is placed on the head portion 49 causing the head portion 49 to go from the open condition to the closed condition. In the closed condition, the pintail 70 is gripped by the head portion 49.

Figure 7:
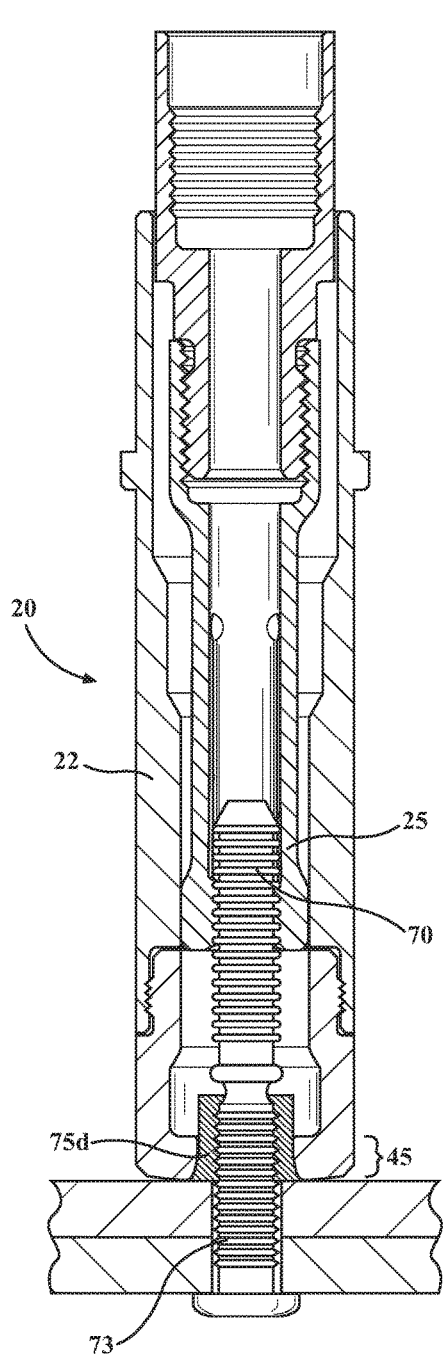
FIG. 7 is a cross sectional view of the nose assembly swaging a collar.

As shown in FIG. 7, after the pintail 70 has been gripped, the puller 25 continues to retract within the holder 22 towards the retraction position. As the puller 25 retracts, the collar 75d is swaged and secured to the lockbolt 73 as it is drawn into the swage portion 45. The interior diameter of the swage portion is less than an outer diameter of the collar. As the collar 75d is drawn into the swage portion 45, the collar 75d deforms such that the collar 75d takes a new shape that conforms both to the swage portion 45, and to the lockbolt 73. The deformed collar 75d takes on a complimentary form to the protrusions and grooves on the lockbolt 73.

Figure 8:
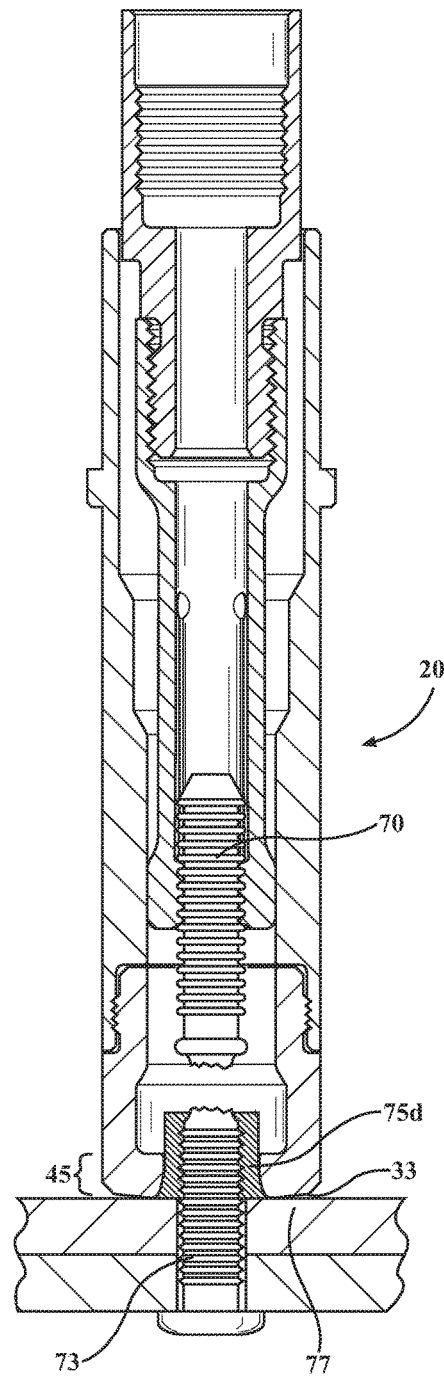
FIG. 8 is a cross sectional view of the nose assembly with a pintail separated from the lockbolt.

As shown in FIG. 8, once the collar 75d has been drawn into the swage portion 45, the open terminal end 33 abuts a workpiece 77 in which the lockbolt 73 resides, thereby inhibiting further moment of the lockbolt 73 into the holder 22. However, the puller 25 continues its retraction movement away from the open terminal end 33 towards the retracted position. Tension is generated in the lockbolt 73 until the pintail 70 is separated. The separation may occur in a necking area of the lockbolt 73 intended to facilitate separation of the pintail 70 from the lockbolt 73 at a certain predetermined tension load.

Figure 9:
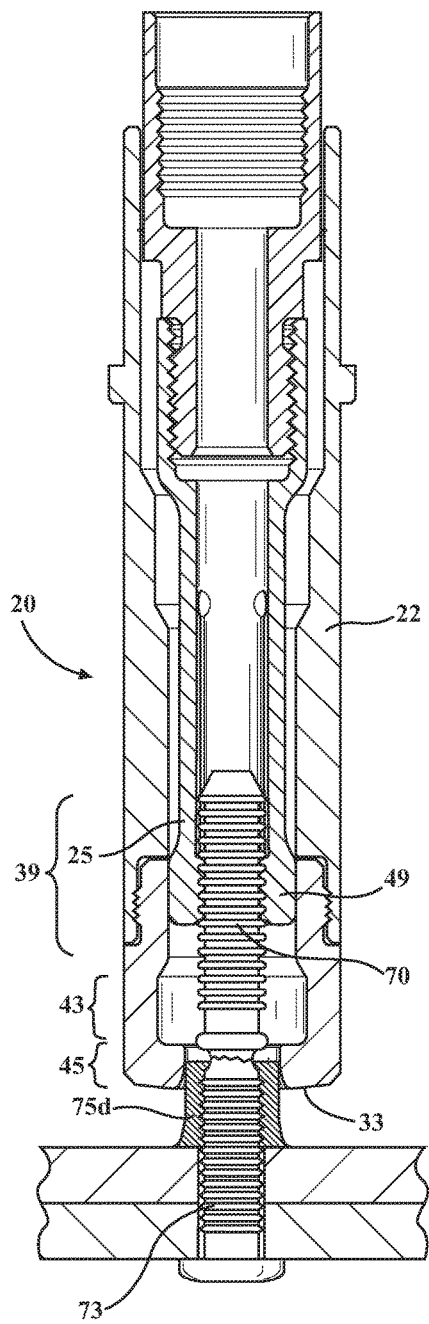
FIG. 9 is a cross sectional view of the nose assembly with the pintail being used to remove the nose assembly from the collar.

As shown in FIG. 9, after the pintail 70 has been separated from the lockbolt 73, the puller 25 extends from the retracted position, moving towards the open terminal end 33. The head portion 49 slides within the retraction portion 39 of the holder 22, thereby maintaining the head portion 49 in the closed condition. As it slides, the pintail 70 abuts the lockbolt 73. Urged towards the open terminal end 33 by the puller 25, the pintail 70 presses against the lockbolt 73, thereby pressing the collar 75d out of the swage portion 45.

Figure 10:
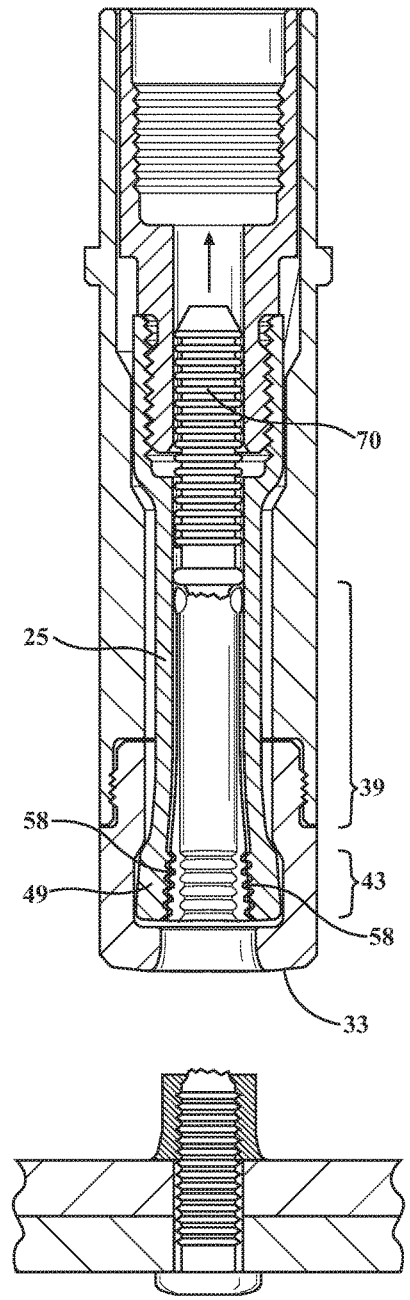
FIG. 10 is a cross sectional view of the nose assembly in the extended position releasing the pintail.

As shown in FIG. 10, the puller 25 continues to extend, the head portion 49 sliding from the retraction portion 39 into the recess portion 43. Once the head portion 49 is sufficiently disposed in the recess portion 43 to allow the head portion 49 to go from the closed condition to the open condition, the pintail 70 is released from the opposing sets of teeth 58 as they move away from each other. As discussed above, the open condition is provided by the resilience of the puller material and design, and the relative interior diameter dimensions of the retraction portion 39 and the recess portion 43.

After the pintail 70 is released, it is drawn away from the open terminal end 33 through the interior of the holder 22 into lockbolt installation tool by way of vacuum pressure provided in part by the lockbolt installation tool.

While the invention has been described in connection with what is presently considered to be the most practical and preferred embodiment, it is to be understood that the invention is not to be limited to the disclosed embodiment but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A nose assembly for a lockbolt installation tool, the nose assembly comprising:
an elongate tubular holder having a sidewall defining a hollow axially extending interior and an open terminal end, the sidewall defining along its length a first interior diameter, and, proximate the open end, an annular recess of a second interior diameter greater than the first interior diameter;
an elongate hollow and generally cylindrical puller coaxially disposed within the hollow interior, and axially slidably displaceable relative to the holder sidewall;
the puller having an annular head portion of a diameter that fits into the holder annular recess when aligned therewith;
the puller having at least two axially extending slots formed therein to create radial resilience in the head portion, the head portion configured to be in a normally open condition while disposed in the annular recess, and capable of transitioning to a closed condition upon application of a radial force, with the radial resilience transitioning the head portion back to the open condition when the radial force is removed;
the puller head portion being configured with opposing interior sets of teeth for gripping a lockbolt pintail; and
the gripping teeth and head portion being sized and configured to close grippingly on a lockbolt pintail when the puller is axially displaced relative to the holder sidewall sufficiently to draw the head portion at least partially out of the recess and into the first interior diameter length, said sidewall further defining a swage portion with a third interior diameter, the swage portion being located between the open terminal end of the holder and the annular recess.

2. The nose assembly of claim 1, wherein the third interior diameter is less than the second interior diameter.

3. The nose assembly of claim 1, wherein the third interior diameter is less than the first interior diameter.

4. The nose assembly of claim 1 further comprising:
the sidewall further defining an interior frustoconical portion, the interior frustoconical portion connecting the first interior diameter to the second interior diameter.

5. The nose assembly of claim 1 further comprising:
the diameter of the annular head portion defining a first outer diameter;
the puller having a shaft portion,
the shaft portion defining a second outer diameter,
the second outer diameter less than the first outer diameter.

6. The nose assembly of claim 5 further comprising:
the puller having an outer frustoconical portion, the outer frustoconical portion connecting the first outer diameter to the second outer diameter.

7. The nose assembly of claim 6 further comprising:
the sidewall further defining an interior frustoconical portion, the interior frustoconical portion connecting the first interior diameter to the second interior diameter.

8. The nose assembly of claim 1, wherein the holder comprises a main body and an anvil.

9. A nose assembly for a lockbolt installation tool, the nose assembly comprising:
a main body having a hollow axially extending interior;
an anvil secured to the main body, the anvil having a hollow axially extending interior, the anvil comprising a swage portion, a recess portion and a retraction portion, the recess portion being disposed between the swage portion and the retraction portion, the recess portion having an interior diameter that is greater than an interior diameter of the swage portion and an interior diameter of the retraction portion;
a puller comprising a shaft portion and a head portion, the head portion having a larger outer diameter than the shaft portion, the head portion movable between a normally open condition and capable of transitioning to a closed condition upon application of a radial force, a radial resilience transitioning the head portion back to the open condition when the radial force is removed; and
the puller slidably disposed in the hollow axially extending interior of the main body and in the hollow axially extending interior of the anvil, the puller able to move within the hollow axially extending interiors between an extended position and a retracted position, in the extended position the head portion of the puller is disposed in the recess portion of the anvil with the head portion in the normally open condition, and in the retracted position the head portion of the puller is disposed in the retraction portion of the anvil with the head portion in the closed condition.

10. The nose assembly of claim 9 further comprising:
the anvil having an interior frustroconical portion defined by an angled interior annular surface surrounding a circumference of the hollow axially extending interior of the anvil in a location where the recess portion meets the retraction portion;
the puller having outer frustoconical portion defined by an angled outer annular surface surrounding a circumference of the puller in a location where the head portion meets and the shaft portion; and
the nose assembly is configured such that when the puller is moved from the extended position to the retracted position, the interior frustroconical portion of the anvil slidably engages the outer frustoconical portion of the puller to provide the radial force, thereby causing the head portion of the puller to go from the open condition to the closed condition.

* * * * *